United States Patent
Oima et al.

[11] Patent Number: 6,108,055
[45] Date of Patent: Aug. 22, 2000

[54] DISPLAY AND METHOD OF FABRICATING THE SAME

[75] Inventors: Susumu Oima, Ohgaki; Norio Tabuchi, Ichinomiya; Kiyoshi Yoneda, Furuhashi, all of Japan

[73] Assignee: Sanyo Electric Co., Ltd., Osaka, Japan

[21] Appl. No.: 08/622,841

[22] Filed: Mar. 27, 1996

[30] Foreign Application Priority Data

Mar. 30, 1995 [JP] Japan ................................ 7-073981

[51] Int. Cl.$^7$ .................... G02F 1/136; G02F 1/1343; G09G 3/36
[52] U.S. Cl. ............... 349/38; 349/39; 349/42; 349/147; 349/151
[58] Field of Search ................. 349/38, 39, 42, 349/43, 139, 147, 149, 151; 345/90, 92, 205, 206

[56] References Cited

U.S. PATENT DOCUMENTS 4,787,712  11/1988  Ukai et al. ........................ 349/38
5,021,774  6/1991  Ohwada et al. ..................... 345/90

FOREIGN PATENT DOCUMENTS 61-277926  12/1986  Japan .
5-11272    1/1993   Japan .
7-28090    1/1995   Japan .

*Primary Examiner*—William L. Sikes
*Assistant Examiner*—Tai V. Duong
*Attorney, Agent, or Firm*—Arent Fox Kintner Plotkin & Kahn, PLLC

[57] ABSTRACT

A liquid crystal display includes a display region which is provided with a display pixel driving element, a drain driver which is arranged at least on a part around the display region for supplying a video signal to the display pixel driving element of the display region, a gate driver which is arranged at least on a part around the display region for supplying a scanning signal to the display pixel driving element of the display region, a drain line which is provided to connect the display region with the drain driver, and an additional capacitive electrode which is provided on a region between the display region and the drain driver.

15 Claims, 12 Drawing Sheets

DISPLAY AND METHOD OF FABRICATING THE SAME

BACKGROUND OF THE INVENTION

1. Field of the Invention

The present invention relates to a display and a method of fabricating the same, and more particularly, it relates to a driver-integrated display comprising a display pixel part and a peripheral driver for driving the display pixel part which are formed on the same substrate, and a method of fabricating the same.

2. Description of the Background Art

In recent years, a semiconductor device having a semiconductor layer of polycrystalline silicon which is extremely higher in carrier mobility than amorphous silicon is watched with interest. Such a semiconductor device includes a driver-integrated liquid crystal display comprising a display pixel part provided with a plurality of display pixels and a peripheral driver for driving the display pixels, which are formed on the same substrate.

The conventional driver-integrated liquid crystal display is now described.

FIG. 15 is a general block diagram showing the conventional driver-integrated liquid crystal display. Referring to FIG. 15, the conventional driver-integrated display comprises a display region 28 provided with display pixels which are connected with thin film transistors (TFT) serving as display driving elements, and a peripheral driving circuit consisting of drain drivers 24 and gate drivers 25 for driving the display driving elements, which are provided on the same substrate 1.

FIG. 16 is a plan view showing a pixel part of the conventional display, i.e., the display driving elements provided in the display region and wirings between the elements. As shown in FIG. 16, drain lines 26 to which video signals are transmitted are positioned above gate lines 6 of intermediate wirings, to serve as upper wirings. Pixel electrodes 17 are formed in regions which are enclosed with the drain lines 26 and the gate lines 6. A storage capacitive electrode 27 is formed to overlap with each pixel electrode 17, in order to form a storage capacitance.

Further, TFT capacitances in the TFTs and cross capacitances between the drain and gate lines are present as parasitic capacitances. While the storage capacitances are largely designed with respect to the parasitic capacitances, compensation by the storage capacitances is made only in case of a voltage drop during electric interception of the TFTs.

The aforementioned point is described with reference to FIG. 17. FIG. 17 is an equivalent circuit diagram of the conventional display unit. The drain driver 24, the gate driver 25, and the display region occupying the remaining region are provided on the same substrate 1. The drain driver 24 is formed by a shift register 29 and a sampling transistor 30 which receives a shift pulse from the shift register 29 for sampling the video signal from each drain line 26. On the other hand, the display region of the liquid crystal display is formed by a TFT t1, a liquid crystal 23 to which the sampled video signal is applied from a source of the TFT t1, and a storage capacitance SC. Thus, the storage capacitance, which is provided on the liquid crystal region, is not adapted to compensate for potential change in conduction of the TFT.

In order to illustrate a portion forming the aforementioned parasitic capacitance, FIG. 18 shows a sectional view taken along each drain line 26 of the conventional driver-integrated liquid crystal display. Referring to FIG. 18, the drain line 26 electrically connects the sampling transistor 30 of the drain driver region with the TFT t1 of the display region. The parasitic capacitance is proportionate to the overlapping area of the gate line 6 and the drain line 26 through an interlayer insulating film 9, and the number of intersections between such gate lines 6 and drain lines 26. As shown in FIG. 18, however, no counter electrode is present under the drain line 26 in a region close to a power source, i.e., a region close to the drain driver region, and hence no additional capacitance is formed.

As shown in FIG. 18, display pixels which are connected with the TFTs serving as display driving elements and a peripheral driving circuit consisting of drain drivers and gate drivers for driving the display driving elements are formed on the same substrate in a driver-integrated display.

FIGS. 19(a) to 19(f) are sectional views, taken along a line IV—IV in FIG. 3 described later, showing steps of fabricating the conventional liquid crystal display shown in FIG. 18.

<Step 1: FIG. 19(a)>

Polycrystalline silicon films 2 are formed on an insulating substrate 1 by LP-CVD (low-pressure chemical vapor deposition). The polycrystalline silicon films 2 are patterned in the form of islands, and separated into regions for forming a storage capacitance part, a TFT part and a drain driver.

<Step 2: FIG. 19(b)>

Gate insulating films 3 are formed on the polycrystalline silicon films 2 by LP-CVD, under film forming conditions of $O_2$ gas and $SiH_4$ gas at a ratio $O_2/SiH_4$ of 5 to 200, a film forming temperature of 400 to 450° C., and pressure of 1 Torr.

Then, resist films 4 are formed on the gate insulating films 3 except regions to be subjected to injection of phosphorus (P) by ion implantation later.

<Step 3: FIG. 19(c)>

Phosphorus (P) is injected into the polycrystalline silicon films 2 by ion implantation masked by the resist films 4, to form $n^+$-type polycrystalline silicon films.

Then, the resist films 4 are removed, and gate electrodes 5 and 8 are formed on the gate insulating films 3 for TFTs t1 and t2 of a display driving element and the drain driver respectively, while a gate line 6 is formed on the substrate 1. The electrodes 5 and 8 and the gate line 6 are prepared by forming polycrystalline silicon films by LP-CVD, forming tungsten silicide films on the polycrystalline silicon films, and thereafter etching the same by photolithography.

The polycrystalline silicon films forming the TFTs t1 and t2 of the display driving element and the drain driver respectively define active layers, and drain regions 12 and 14 and source regions 11 and 13 are formed on both sides of the gate electrodes 5 and 8 respectively.

<Step 4: FIG. 19(d)>

An interlayer insulating film 9 is formed to cover the overall substrate 1.

<Step 5: FIG. 19(e)>

Contact holes 10 are formed in the interlayer insulating film 9, by anisotropic etching. These contact holes 10 are formed in the drain regions 12 and 14 and the source regions 11 and 13 of the TFTs t1 and t2 of the display driving element and the drain driver.

Then, a pixel electrode 17 consisting of ITO is formed on the interlayer insulating film 9 covering a pixel part, by sputtering.

<Step 6: FIG. 19(f)>

An alignment film 18 is formed on the overall region of the substrate 1 including a storage capacitive electrode 27 and the TFTs t1 and t2 of the display driving element and the drain driver formed through the aforementioned steps. Further, a common electrode 20 consisting of ITO or the like and an alignment film 21 are successively formed on an opposite counter substrate 19.

Portions around the peripheries of the substrate 1 and the counter substrate 19 are pasted to each other with a sealing agent 22. The inside enclosed with the sealing agent 22 defines a display pixel region. This region is filled up with liquid crystals 23, thereby completing the liquid crystal display.

Characteristic problems of the conventional liquid crystal display which is fabricated in the aforementioned manner are now described.

First, the relation between a driving waveform and light transmittance in a liquid crystal display of an NW (normally white) mode is described. In the NW mode, the liquid crystal display has higher light transmittance upon application of a low voltage to liquid crystals as compared with that upon application of a high voltage. When twisted nematic (TN) liquid crystals are employed, for example, the liquid crystal display can be brought into the NW mode by orthogonalizing the axes of polarization of two polarizing plates which are arranged on both sides of the liquid crystal display to each other.

FIG. 20 illustrates the light transmittance of the conventional liquid crystal display of the NW mode. When a scanning signal Vg is applied to gates of TFTs serving as display driving elements which are arranged in the form of a matrix every horizontal scanning period, a row of TFTs conduct.

Then, consider that the amplitude of a video signal Vd is reduced in an intermediate stage, as shown in FIG. 20. Referring to FIG. 20, the video signal Vd which is transmitted to pixel electrodes through sources of conducting TFTs from drain lines of the TFTs has a large amplitude up to an (i+1)-throw, and a small amplitude after an (i+2)-th row. When the amplitude of the video signal Vd is thus reduced in the intermediate stage, the light transmittance T is not immediately increased, as shown in FIG. 20. Namely, a portion over several rows from that having the abrupt change of the video signal Vd, i.e., from the (i+2)-th row to an (i+4)-th row, is grayly displayed in the conventional liquid crystal display. Such a phenomenon is called a smear phenomenon. When the smear phenomenon is caused over several rows to tens of rows, the screen of the liquid crystal display appears contaminated, while visibility such as the contrast, color reproducibility and resolution of the liquid crystal display are damaged.

The aforementioned smear phenomenon is conceivably caused by the following reason: The capacitances which are formed between the drain lines of the display region and the common electrode provided on the counter substrate and between the drain lines and the gate lines are small, and these capacitances are readily changed by voltages which are applied to the drain lines due to the presence of the liquid crystals between the same and the common electrodes. When a video signal (black signal) having a large amplitude is written in the liquid crystals, therefore, the aforementioned smear phenomenon takes place to gradually whiten the display from gray over several rows to tens of rows if the transverse direction of black display, i.e., a scan direction of a gate signal (from left to right when the gate signal is inputted from the left side in the display, for example) is in white display.

SUMMARY OF THE INVENTION

An object of the present invention is to provide a display which can suppress occurrence of the aforementioned smear phenomenon by forming an additional capacitance in a region between a drain driver and a display region, and a method of fabricating the same.

The display according to the present invention comprises a display region which is provided with a display pixel driving element, a drain driver which is arranged at least on a part around the display region for supplying a video signal to the display pixel driving element of the display region, a gate driver which is arranged on at least a part around the display region for supplying a scanning signal to the display pixel driving element of the display region, a drain line which is provided to connect the display region with the drain driver for supplying the video signal, and an additional capacitive electrode which is provided in a region between the display region and the drain driver.

According to the present invention, the additional capacitive electrode may be plurally divided.

In a preferred embodiment of the present invention, an interlayer insulating film is provided between the drain line and the additional capacitive electrode, so that a capacitance is formed between the drain line and the additional capacitive electrode. More preferably, a contact hole is formed in the interlayer insulating film, so that the capacitance is formed between the drain line and the additional capacitive electrode in the contact hole.

In another preferred embodiment of the present invention, an insulating film is provided under the additional capacitive electrode and a lower wiring is provided under the insulating film, so that a capacitance is formed between the lower wiring and the additional capacitive electrode. More preferably, the lower wiring is electrically connected with the drain line on both sides of the additional capacitive electrode in this embodiment. Thus, electrical connection can be ensured by the lower wiring even if the drain line is disconnected by any chance.

The additional capacitive electrode employed in the present invention is not particularly restricted but can be formed by a conductor layer. Such a conductor layer may have a multilayer structure obtained by forming a metal silicide layer on a polycrystalline silicon layer which is doped with an impurity, for example. Alternatively, a single layer consisting of metal silicide may be formed as the additional capacitive electrode.

According to the present invention, the display pixel driving element and the drain driver preferably comprise thin film transistors. The gate driver also preferably comprises a thin film transistor. Such thin film transistors are preferably formed on the same substrate. Therefore, the display pixel driving element, the drain driver and the gate driver are preferably formed on the same substrate. Thus, the present invention is preferably applied to a driver-integrated liquid crystal display.

Gate electrodes of such thin film transistors and the additional capacitive electrode are preferably formed in the same fabrication step. Therefore, these electrodes are preferably prepared from thin films having the same structure.

According to the present invention, the additional capacitive electrode may be directly provided on the substrate, or a lower wiring may be provided on the substrate so that the additional capacitive electrode is provided thereon through an insulating film.

In still another preferred embodiment of the present invention, the display comprises a display pixel driving element for driving a liquid crystal display pixel, a drain driver having a sampling transistor for sampling a video signal which is supplied to the display pixel driving element, a gate driver for supplying a scanning signal to the display pixel driving element, and an additional capacitance which is provided between the sampling transistor and the display pixel driving element.

A method according to the present invention is adapted to fabricate a driver-integrated liquid crystal display comprising a display pixel part provided with a plurality of display pixels, and a drain driver and a gate driver for driving the display pixels, which are provided on the same substrate. This method comprises the steps of forming a semiconductor film on a substrate, forming an insulating film on the semiconductor film, forming an additional capacitive electrode on the insulating film in a region between a drain driver and a display pixel part, forming an interlayer insulating film on the additional capacitive electrode, and forming a drain line on the insulating film for electrically connecting the display pixel part with the drain driver and forming an additional capacitance between the same and the additional capacitive electrode.

In the method according to the present invention, the semiconductor film which is formed on the substrate is preferably so patterned as to form active layers of thin film transistors of a display pixel driving element provided in the display pixel part, the drain driver and the gate driver, and a lower wiring for forming an additional capacitance between the same and the additional capacitive electrode.

In the method according to the present invention, a conductive film which is formed on the insulating film is preferably so patterned as to form gate layers of the thin film transistors of the display pixel driving element provided in the display pixel part, the drain driver and the gate driver, and the additional capacitive electrode.

A preferred embodiment of the method according to the present invention is adapted to fabricate a driver-integrated liquid crystal display comprising a display pixel part provided with a plurality of display pixels and a peripheral circuit part for driving the display pixels, which are formed on the same substrate. This method comprises the steps of forming a semiconductor film on a substrate which is made of an insulator at least on its surface, separating the semiconductor film into a display pixel part, a peripheral circuit part, and an additional capacitance part which is provided on a region between the display pixel part and the peripheral circuit part, forming insulating films on the respective ones of the separated semiconductor films for defining insulating films of driving elements of the display pixel part and the peripheral circuit part and an additional capacitance insulating film of the additional capacitance part, forming impurity shielding films on the insulating films, introducing an impurity into the semiconductor films through clearances between the impurity shielding films for forming lower electrodes of the display pixel part and the peripheral circuit part and a lower wiring of the additional capacitance part, removing the impurity shielding films, depositing low resistance films on the insulating films for forming intermediate electrodes of the display pixel part and the peripheral circuit part and an additional capacitance wiring of the additional capacitance part, depositing an interlayer insulating film on the low resistance films, the insulating films and the substrate, removing parts of the interlayer insulating film which are located on the lower electrodes of the display pixel part and the peripheral circuit part and the insulating films for forming contact holes, depositing a wiring material in the contact holes and on the interlayer insulating film for bringing the lower electrodes into contact with the wiring material and forming wirings between the display electrode part and the additional capacitance part, between the peripheral circuit part and an external circuit, and between the additional capacitance part and the peripheral circuit part, forming a pixel electrode on the interlayer insulating film which is located on the display pixel part and connecting the same with the driving element of the display pixel part, forming an alignment film at least on the pixel electrode, and holding an electrooptical substance between the substrate and a counter substrate comprising an alignment film and a common electrode being opposed to the substrate.

In the aforementioned preferred embodiment, the peripheral circuit part comprises a drain driver for supplying a video signal to the display pixel part, and a gate driver for supplying a scanning signal to the display pixel part.

According to the present invention, the additional capacitive electrode is provided on the region between the drain driver and the display region, for forming an additional capacitance. This additional capacitance can be made sufficiently larger than capacitances between the drain line and other electrodes. Further, the capacitance which is formed by the additional capacitive electrode is stable since the same is not through liquid crystals. Thus, it is possible to eliminate a smear phenomenon which is caused when a video signal (black signal) having a large video signal amplitude is written in liquid crystals, whereby improvement of the characteristics such as the contrast and resolution can be achieved and the picture quality of the display can be improved.

The foregoing and other objects, features, aspects and advantages of the present invention will become more apparent from the following detailed description of the resent invention when taken in conjunction with the accompanying drawings.

DESCRIPTION OF THE PREFERRED EMBODIMENTS

Figure 11:
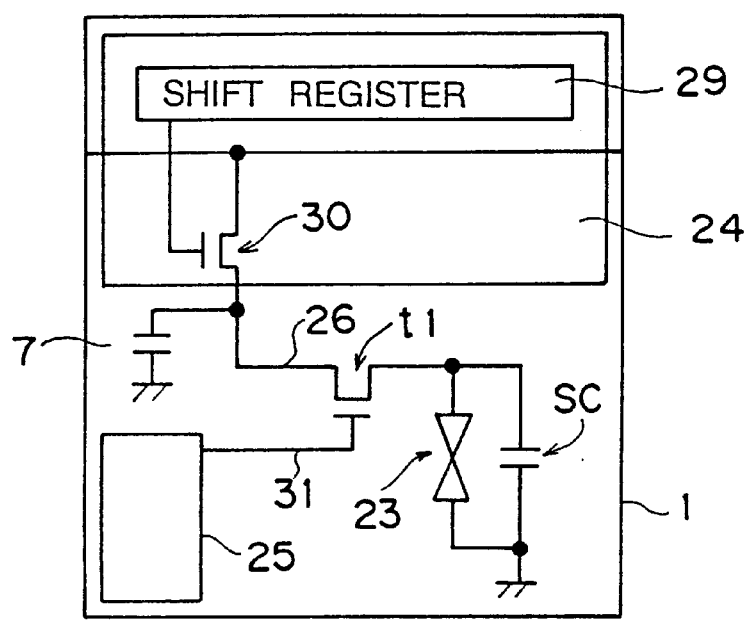
FIG. 11 illustrates an equivalent circuit of the display according to the present invention.

FIG. 11 illustrates an equivalent circuit of a display according to the present invention. Referring to FIG. 11, a drain driver 24, a gate driver 25, and a display region are provided on a substrate 1. The drain driver 24 comprises a shift register 29, and a sampling transistor 30 which receives a shift pulse from the shift register 29 for sampling a video signal from a drain line 26. The display region of the liquid crystal display comprises a TFT t1 defining a display pixel driving element for driving a display pixel, a liquid crystal 23 to which the sampled video signal is applied from a source of the TFT t1, and a storage capacitance SC. The TFT t1 has a gate electrode which is connected with a gate line 31 from the gate driver 25, a drain electrode which is connected with the drain line 26, and a source electrode which is connected with one of electrodes holding the liquid crystal 23. As shown in FIG. 11, an additional capacitance 7 is formed between the sampling transistor 30 and the display region. Such an additional capacitance 7 can be made sufficiently larger than capacitances between the drain line 26 and other electrodes, and can be stabilized since the same is provided in the vicinity of the sampling transistor 30.

Figure 13:
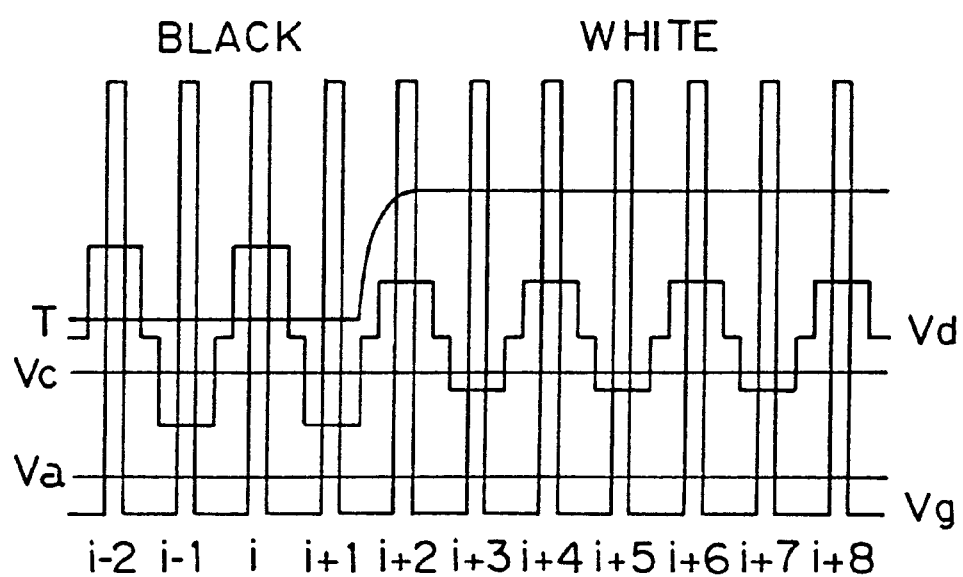
FIG. 13 is a characteristic diagram showing the characteristics of the display according to the present invention.
Figure 20:
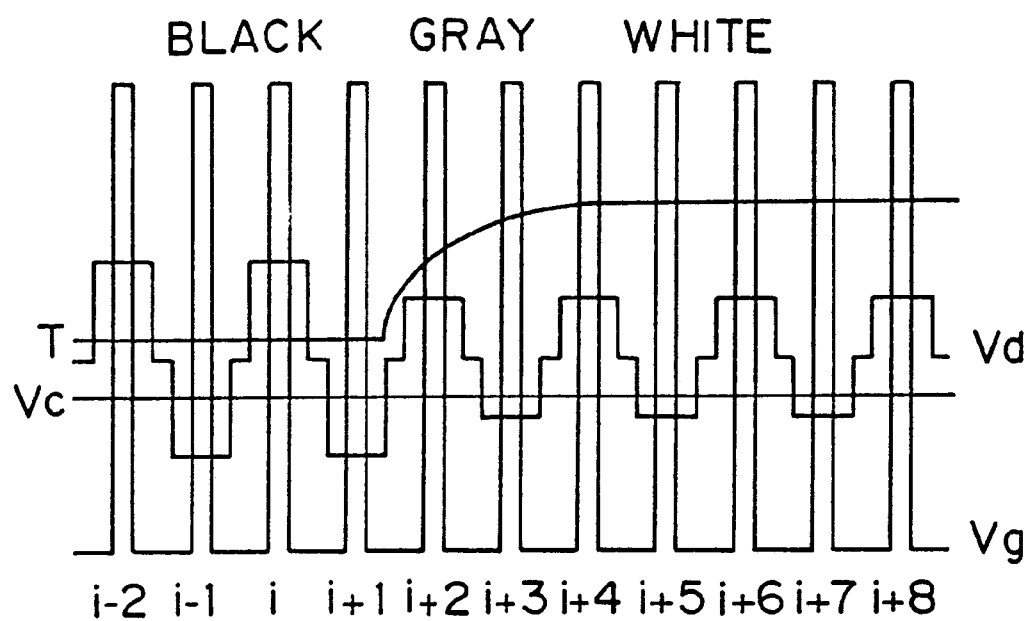
FIG. 20 is a characteristic diagram showing the characteristics of the conventional display.

FIG. 13 is a characteristic diagram showing the characteristics of the display according to the present invention shown in FIG. 11, which can be compared with FIG. 20 showing the characteristics of the conventional display. As shown in FIG. 13, a video signal Vd which is transmitted to a pixel electrode through the source of the conducting TFT from the drain line of the TFT has a large amplitude up to an (i+1)-th row, and a small amplitude after an (i+2)-th row. According to the present invention, light transmittance T is abruptly changed in response to the video signal Vd without being influenced by a previous video signal, even if the video signal Vd is changed from the (i+1)-th row to the (i+2)-th row, as shown in FIG. 13. Thus, white image can be directly changed to black image with no gray image, dissimilarly to the prior art. According to the present invention, therefore, clear screen display of high definition can be made with high color reproducibility with respect to a video signal having a high rate of change, with no smear phenomenon.

Also with respect to a video signal having a low rate of change, gradation expression which is faithful to the video signal can be carried out since no influence is exerted by a video signal of an adjacent row, whereby a color corresponding to fine difference between reflectances for light from a light source can be expressed.

The structure of a driver-integrated liquid crystal display according to the present invention is now described.

Figure 1:
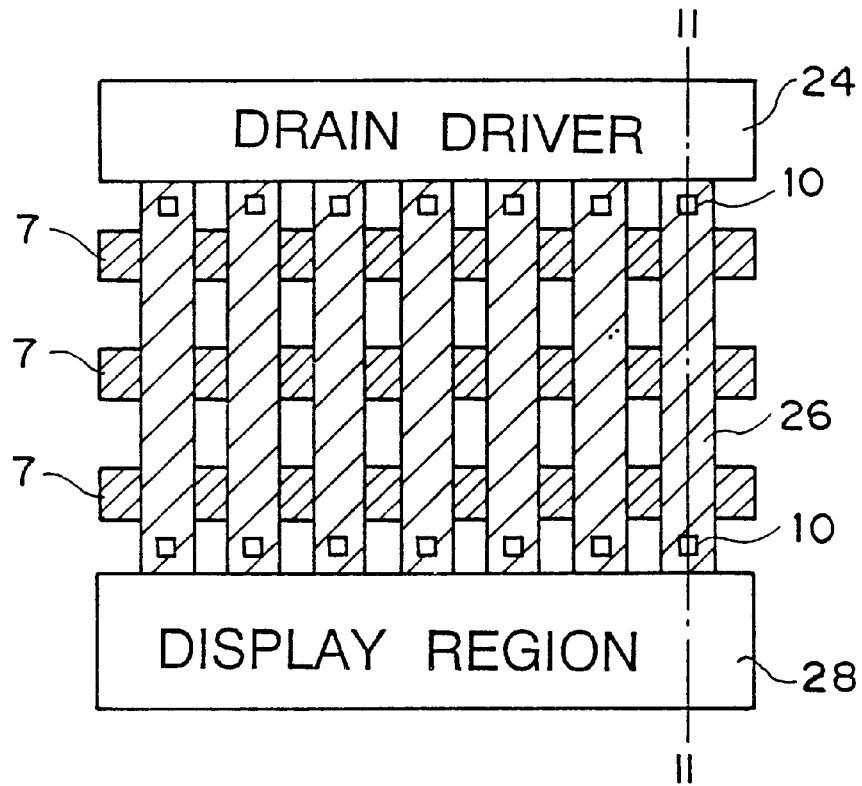
FIG. 1 is a plan view showing a part of a display according to an embodiment of the present invention.

FIG. 1 is a plan view showing a part of the liquid crystal display according to the present invention. Referring to FIG. 1, a plurality of stripe-shaped additional capacitive electrodes 7 are provided under drain lines 26 connecting a drain driver 24 with a display region 28, so that additional capacitances are formed on the intersections between the additional capacitive electrodes 7 and the drain lines 26.

The drain lines 26 are connected with the drain driver 24 as well as with drains of TFTs, serving as display driving elements of the display region 28, through contact holes 10. The display region 28 is provided with display pixels in the form of a matrix.

According to this embodiment, cracking caused by formation of the additional capacitive electrodes can be prevented by dividing the additional capacitive electrodes into a plurality of stripe-shaped electrodes.

Further, each additional capacitive electrode 7 can be provided with an additional capacitance which is at least twice a storage capacitance or a parasitic capacitance. In more concrete terms, an additional capacitance of at least 5 to 10 pF can be formed in a display having about 640 to 400 pixels.

Figure 2:
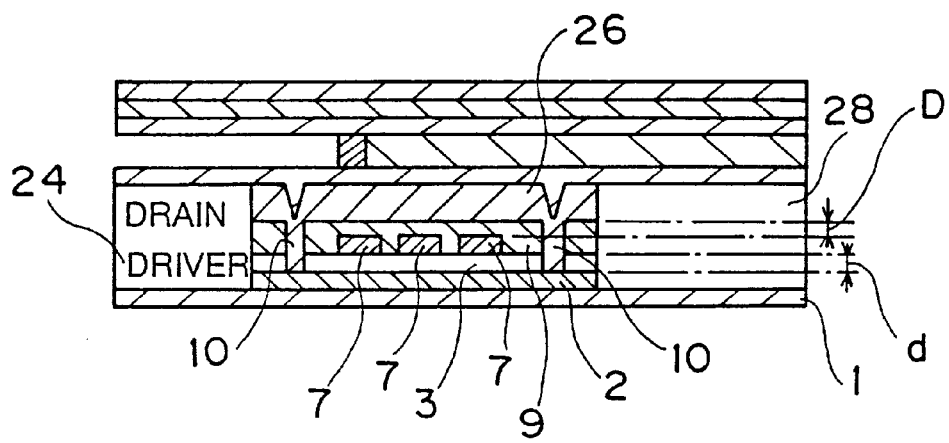
FIG. 2 is a sectional view of the display shown in FIG. 1 taken along the line II—II.

FIG. 2 is a sectional view taken along the line II—II in FIG. 1. Referring to FIG. 2, a polycrystalline silicon film 2 which is doped with phosphorus (P) is provided on the substrate 1 in a region between the drain driver 24 and the display region 28. The substrate 1 is formed by an insulating substrate of quartz glass, for example. An insulating film 3 of 1000 to 2000 Å in thickness is provided on the polycrystalline silicon film 2. The stripe-shaped additional capacitive electrodes 7 which are plurally divided are formed on the insulating film 3. Each additional capacitive electrode 7 has a two-layer structure obtained by stacking a polycrystalline silicon layer which is doped with boron and a silicide layer of a metal such as Ti, Mo or W. An interlayer insulating film 9, consisting of $SiO_2$, of 5000 to 10000 Å in thickness is formed on the additional capacitive electrodes 7 and the insulating film 3. The contact holes 10 reaching the polycrystalline silicon film 2 are formed in the interlayer insulating film 9. The drain line 26 consisting of Al is formed on the interlayer insulating film 9 and in the contact holes 10. This drain line 26 is electrically connected with the polycrystalline silicon film 2 through the contact holes 10.

According to this embodiment, the additional capacitances are formed between the polycrystalline silicon film 2 and the additional capacitive electrodes 7 (d in FIG. 2) and between the drain line 26 and the additional capacitive electrodes 7 (D in FIG. 2).

Figure 3:
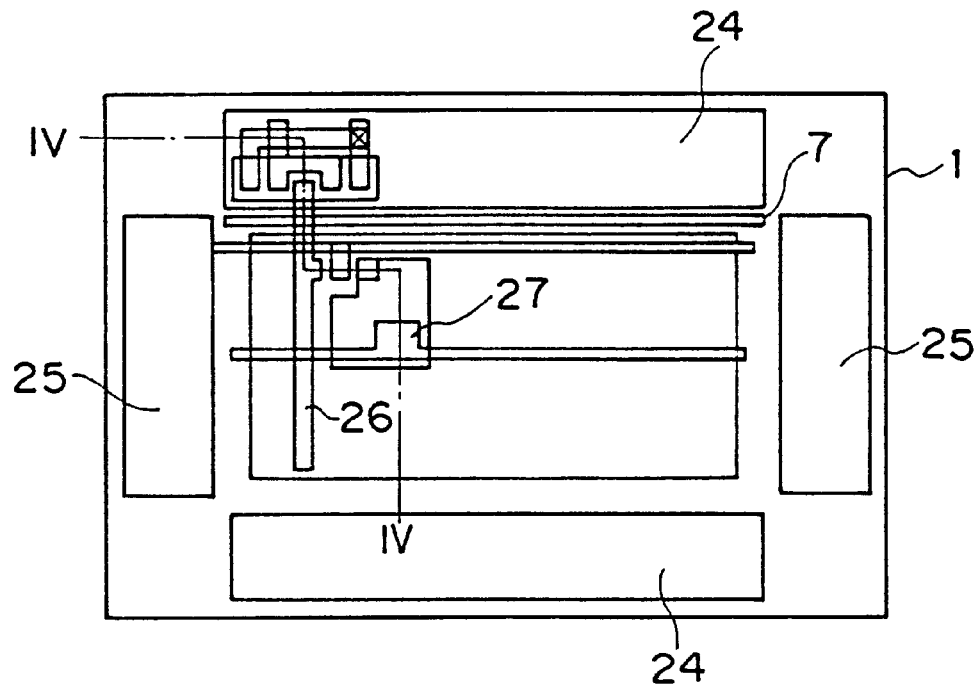
FIG. 3 is a schematic block diagram showing the overall display according to the embodiment of the present invention.

FIG. 3 is a block diagram showing the overall driver-integrated liquid crystal display according to this embodiment. Referring to FIG. 3, the display region comprising the TFTs serving as display driving elements and a peripheral driving circuit consisting of the drain and gate drivers 24 and 25 for driving the display driving elements are formed on the same substrate 1. The additional capacitive electrodes 7 are formed between the display region and the drain drivers 24. Although FIG. 3 shows only one additional capacitive electrode 7, a plurality of such additional capacitive electrodes 7 are formed in practice, as shown in FIGS. 1 and 2. While the drain drivers 24 and the gate drivers 25 are arranged on upper, lower, right and left sides of the display region, only one drain driver 25 may alternatively be formed on the upper or lower side, and only one gate driver 26 may be formed on the right or left side.

Figure 4:
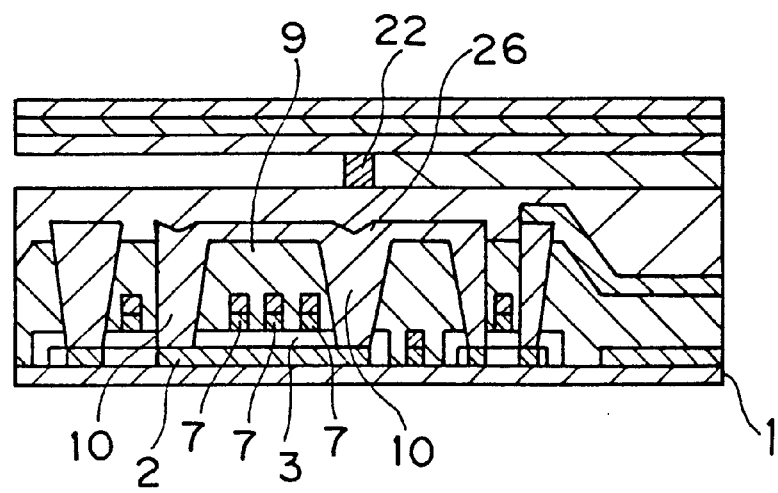
FIG. 4 is a sectional view taken along the line IV—IV in FIG. 3.

FIG. 4 is a partial sectional view taken along the line IV—IV in FIG. 3. The feature of the embodiment shown in FIG. 4 resides in that the drain line 26 and a lower wiring 2 are connected with each other on both sides of the additional capacitive electrodes 7. Referring to FIG. 4, the contact holes 10 are formed on both sides of the additional capacitive electrodes 7 in the interlayer insulating film 9 consisting of a silicon nitride film having a dielectric constant of 8, so that the drain line 26 is electrically connected to the lower wiring 2 of the additional capacitance part through the contact holes 10.

Each additional capacitive electrode 7 has a multilayer structure of a doped polycrystalline silicon layer and a titanium silicide layer which is formed thereon. This multilayer structure is similar to that of the drain driver and the gate electrode of each TFT serving as a display pixel driving element.

The additional capacitances are mainly formed between the additional capacitive electrodes 7 and the lower wiring 2 which is opposed thereto through the insulating film 3 of 1000 Å in thickness. The lower wiring 2 is formed by a doped polycrystalline silicon film. According to this embodiment, additional capacitances are also formed between the drain line 26 and side surfaces of the additional capacitive electrodes 7 in the contact holes 10. Therefore, the additional capacitance per unit area is increased.

According to this embodiment, further, the drain line 26 is connected with the lower wiring 2 on both sides of the additional capacitive electrodes 7. Even if the drain line 26 is disconnected by any chance, therefore, conduction can be attained through the lower wiring 2.

Figure 5:
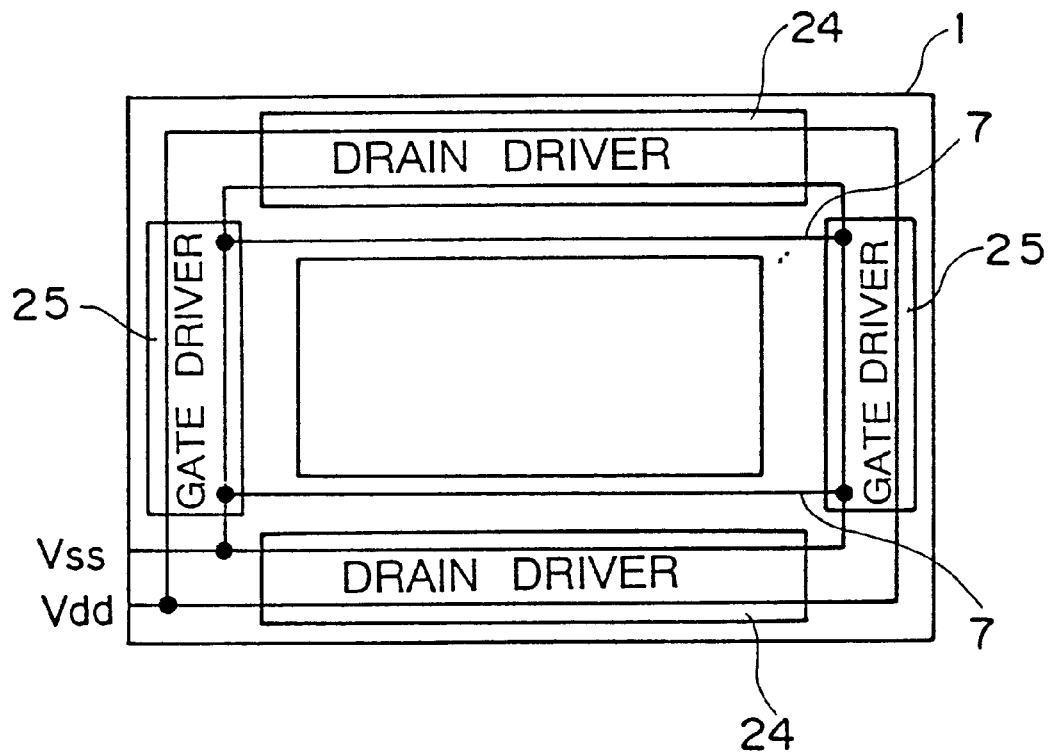
FIG. 5 is a plan view showing the wiring of the display according to the embodiment of the present invention.

FIG. 5 is a wiring diagram showing the wiring for the additional capacitive electrodes in the aforementioned embodiment of the present invention. Referring to FIG. 5, a high voltage power source Vdd and a low voltage power source Vss which are provided on the outer and inner peripheries of the substrate 1 respectively are connected to the drain drivers 24 and the gate drivers 25. The additional capacitive electrodes 7 are connected to Vss which is provided on the inner periphery. V which is expressed in Q=CV can be increased by connecting the additional capacitive electrodes 7 to Vss. Further, the additional capacitive electrodes 7 and Vss can be readily separated from Vdd in accordance with formation order in the fabrication steps, by connecting Vss with the additional capacitive electrodes 7.

Figure 6:
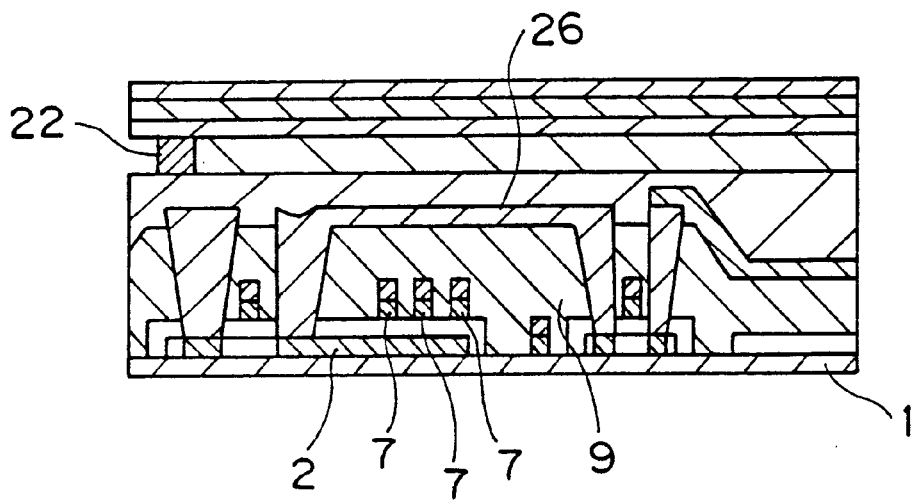
FIG. 6 is a partial sectional view showing a display according to another embodiment of the present invention.

FIG. 6 is a partial sectional view showing a display according to another embodiment of the present invention. Referring to FIG. 6 corresponding to FIG. 4, a lower wiring 2 is connected with a drain line 26 in one portion. The area of an additional capacitance part can be reduced by connecting the lower wiring 2 with the drain line 26 in one portion.

According to this embodiment, a sealing agent 22 is provided in a portion outward beyond that shown in FIG. 4. Namely, the sealing agent 22 is formed to cover a drain driver, whereby a peripheral driving circuit which is integrally formed on a substrate can be protected against moisture.

Figure 7:
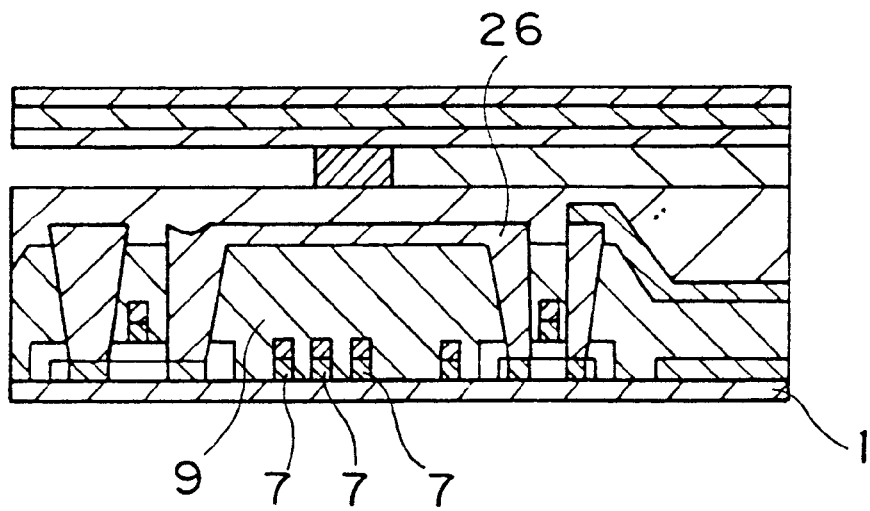
FIG. 7 is a partial sectional view showing a display according to still another embodiment of the present invention.

FIG. 7 is a partial sectional view showing a display according to still another embodiment of the present invention. In the embodiment shown in FIG. 7, additional capacitive electrodes 7 are directly formed on a substrate 1.

Figure 8:
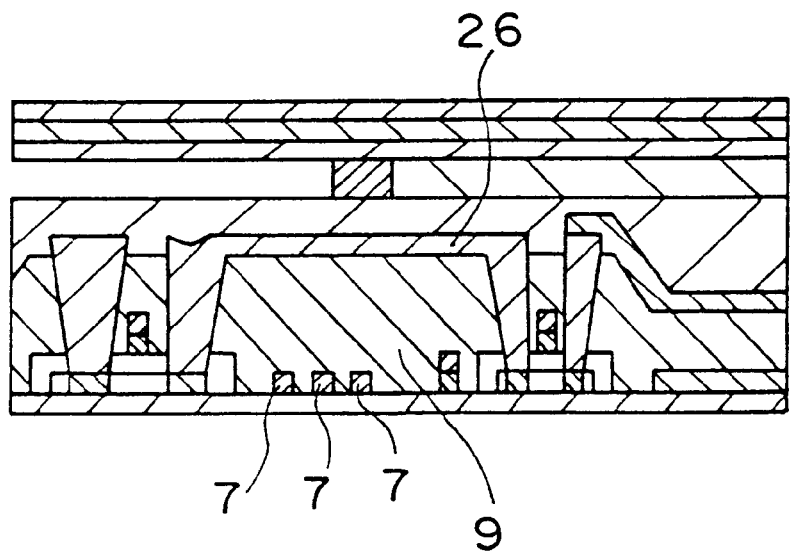
FIG. 8 is a partial sectional view showing a display according to a further embodiment of the present invention.

FIG. 8 is a partial sectional view showing a display according to a further embodiment of the present invention. According to this embodiment, additional capacitive electrodes 7 are formed by single layers. These additional capacitive electrodes 7 are made of a metal such as Ti, Mo or W. Such additional capacitive electrodes 7 of single layers are preferably applied when overall fabrication steps are carried out at temperatures not more than 400° C.

According to this embodiment, the additional capacitive electrodes 7 which are formed by single layers can be reduced in thickness, whereby the thickness of an interlayer insulating film can be reduced so that capacitances larger than those in the remaining embodiments can be formed.

FIGS. 9(a) to 9(f) are sectional views showing steps of fabricating the display according to the embodiment shown in FIG. 4.

Figure 9:
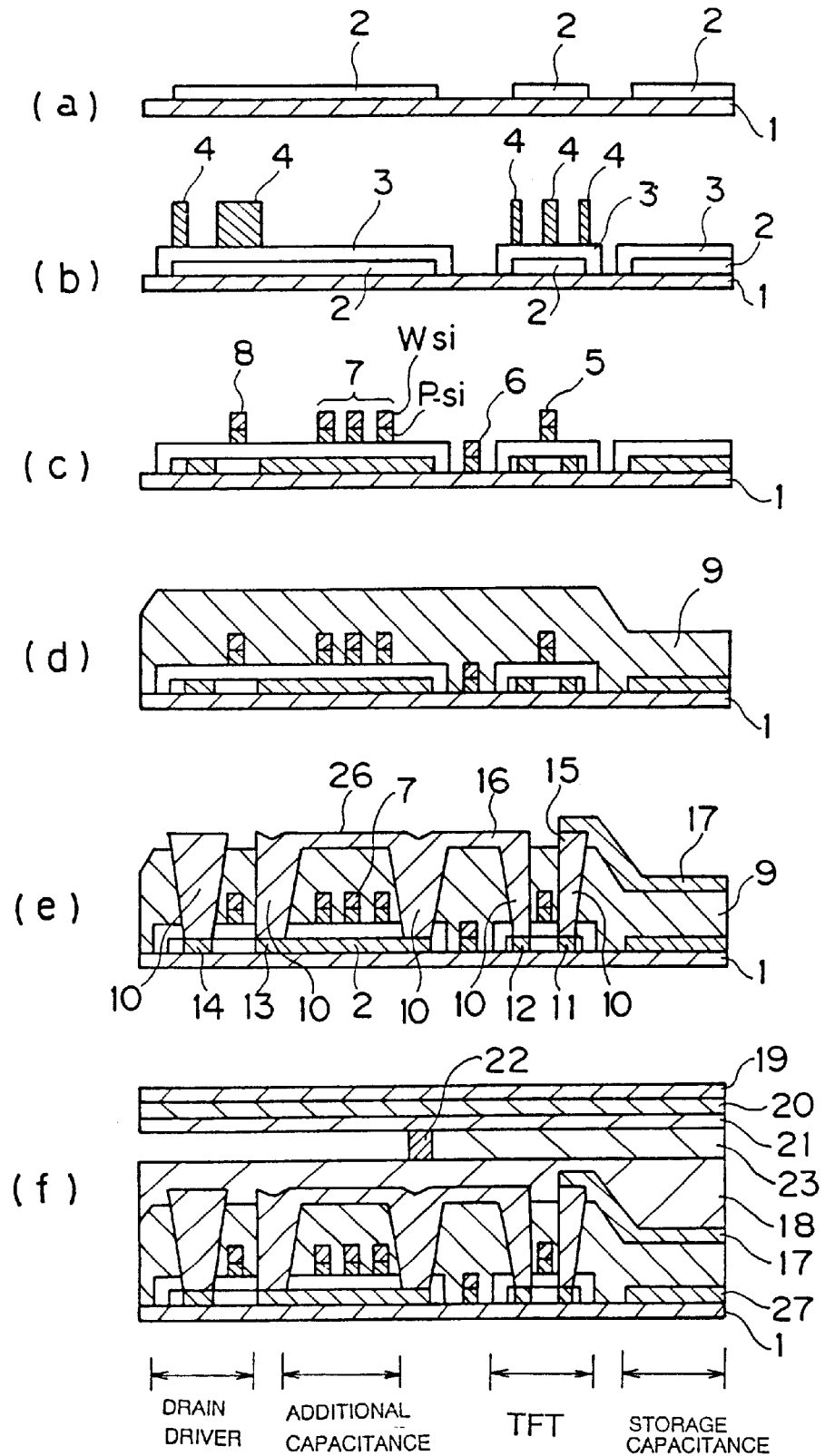
FIGS. 9(a) to 9(f) are partial sectional views showing steps of fabricating the display according to the embodiment shown in FIG. 4.

<Step 1: FIG. 9(a)>

Polycrystalline silicon films 2 are formed on a substrate 1 by LP-CVD. The substrate 1 is prepared from a semiconductor substrate or an insulating substrate. The polycrystalline silicon films 2 are patterned in the form of islands, and formed in regions for defining a storage capacitance part, a TFT part for serving as a display driving element, an additional capacitance part, and a TFT part for serving as a drain driver.

Alternatively, the polycrystalline silicon films 2 may be formed by solid-phase epitaxy of amorphous silicon films in the following manner:

First, amorphous silicon films are formed on the substrate 1 by plasma CVD under forming conditions of a substrate temperature of 500 to 600° C., gas flow rates of 50 sccm for $SiH_4$ and 40 sccm for $H_2$, and RF power of 40 W, for example. A semiconductor substrate can be prepared from silicon or gallium arsenide, while an insulating substrate can be made of any insulating material such as glass, quartz glass, heat-resistant glass, heat-resistant resin, or ceramics. Further, a conductive substrate of a metal or the like which is provided with an insulating film such as a silicon oxide film on its surface, or a substrate consisting of a semiconductor which is provided with an insulating film such as a silicon oxide film on its surface can be employed.

Then, the amorphous silicon films are epitaxially grown in a solid phase by a heat treatment, thereby forming the polycrystalline silicon films 2. Heat treatment conditions of a substrate temperature of 500 to 650° C. and a treatment time of at least 10 times can be employed, for example.

<Step 2: FIG. 9(b)>

HTO (high temperature oxide) films for defining gate insulating films 3 are formed on the polycrystalline silicon films 2. The HTO films can be formed under conditions of a film forming temperature of about 1000° C. and a gas material of saturated steam, for example, to be about 1000 Å in thickness.

Then, resist films 4 are formed on parts of the gate insulating films 3 excluding those subjected to ion implantation of phosphorus (P) later.

The gate insulating films 3 are formed by LP-CVD, AP-CVD (atmospheric pressure chemical vapor deposition*), sputtering, thermal oxidation or the like.

In case of LP-CVD, the gate insulating films 3 can be formed by mixing $O_2$ gas and $SiH_4$ gas in the ratio of $O_2/SiH_4$ of 5 to 200 under film forming conditions of a film forming temperature of 400 to 450° C. and pressure of 1 Torr. In case of AP-CVD, the gate insulating films 3 can be formed by mixing $O_2$ gas and $SiH_4$ gas in the ratio of $O_2/SiH_4$ of 3 to 10 under a film forming temperature of 400 to 450° C. In case of sputtering, the gate insulating films 3 can be formed under film forming conditions of pressure of $5\times10^{-4}$ to $5\times10^{-3}$ Torr and RF power of 300 W. In case of thermal oxidation, the gate insulating films 3 can be formed under conditions of atmospheric pressure and a temperature of 800° C. in an oxygen atmosphere.

<Step 3: FIG. 9(c)>

Then, phosphorus (P) is ion-implanted into the polycrystalline silicon films 2 through the resist films 4 serving as masks, thereby forming $n^+$-type polycrystalline silicon films.

Then, the resist films 4 are removed and electrodes are formed on the respective insulating films 3. A gate electrode 5 is formed on a region of a TFT t1 serving as a display driving element, a gate line 6 is formed between the additional capacitance part and the display driving element, additional capacitive electrodes 7 are formed on the additional capacitance part, and a gate electrode 8 is formed on a region of a TFT t2 of the drain driver. Each electrode has a structure obtained by stacking a tungsten silicide (WSi) film on a polycrystalline silicon (p—Si) film. Both of the polycrystalline silicon film and the tungsten silicide film are 1000 to 2000 Å in thickness. These electrodes are formed on the overall surface, and thereafter etched and patterned by photolithography. The gate electrode 5, the gate line 6, the additional capacitive electrodes 7 and the gate electrode 8 can be extremely efficiently prepared from the same material at the same time.

Alternatively, these electrodes may be prepared from a metal such as aluminum, chromium or molybdenum, for example, by vapor deposition or sputtering.

The polycrystalline silicon films 2 forming the TFTs t1 and t2 of the display driving element and the drain driver define active layers of these TFTs t1 and t2, and drain and source regions are formed on the active layers provided on both sides of the gate electrodes 5 and 8.

<Step 4: FIG. 9(d)>

An interlayer insulating film 9 is formed in a thickness of 7000 to 10000 Å, to cover all electrodes provided on the substrate 1.

<Step 5: FIG. 9(e)>

Then, contact holes 10 are formed in the interlayer insulating film 9 by anisotropic etching. The contact holes 10 are formed on a drain region 12 and a source region 11 of the TFT t1 of the display driving element, both sides of the additional capacitive electrodes 7, and a drain region 14 and a source region 13 of the TFT t2 of the drain driver.

Then, films of aluminum, chromium or molybdenum are formed in thicknesses of 5000 to 10000 Å by vapor deposition or sputtering to fill up the contact holes 10, while forming a drain line 26 on the additional capacitance part and drain and source electrodes 16 and 15 on the TFT t1 of the display driving element. The source electrode 15 and the drain electrode 16 are electrically connected with the source region 11 and the drain region 12 of the display driving element respectively. The drain line 26 and the drain electrode 16 are formed in continuation, and electrically connected with a lower wiring 2 through the contact holes 10 respectively on both sides of the drain line 26.

Figure 12:
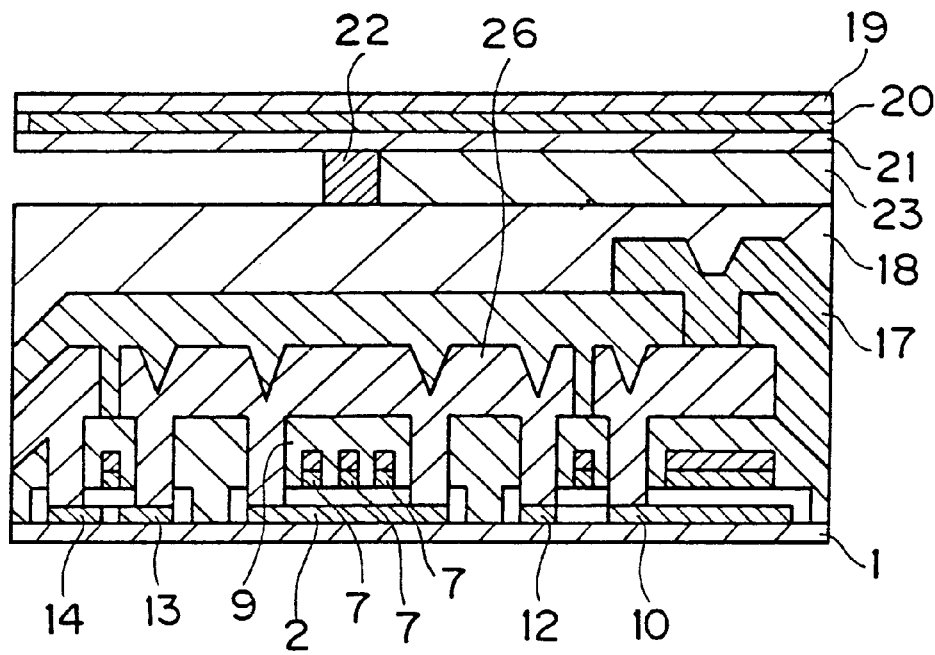
FIG. 12 is a partial sectional view showing a display according to a further embodiment of the present invention.

In the TFT t2 of the drain driver, the drain region 14 is electrically connected with an adjacent shift register (not shown) through the contact hole 10. Further, the source region 13 is continuous with and electrically connected with the lower wiring 2. While the source region 13 of the TFT t2 of the drain driver and the lower wiring 2 provided under the additional capacitive electrodes 7 are connected to a common contact hole 10 in this embodiment, the source region 13 and the lower wiring 2 may alternatively be separated from each other to be connected with separate contact holes 10 respectively, as shown in FIG. 12.

Then, a pixel electrode 17 consisting of ITO is formed on the interlayer insulating film 9 which is located on a pixel part in a thickness of 1000 to 2000 Å by sputtering. The pixel electrode 17 is connected to the source region 11 of the TFT t1 of the display driving element through the source electrode 15 which is formed in the contact hole 10.

<Step 6: FIG. 9(f)>

Then, an alignment film 18 is formed on the overall region of the substrate 1. Further, a common electrode 20 consisting of ITO or the like and an alignment film 21 are formed on a counter substrate 19 which is provided oppositely the substrate 1.

The substrate 1 and the counter substrate 19 are pasted to each other through a sealing agent 22 which is formed in the vicinity of the peripheries of the substrates. The inside enclosed with the sealing agent 22 defines a display region. This region is filled up with liquid crystals 23, thereby completing a liquid crystal display.

While the polycrystalline silicon films are formed by solid-phase epitaxy in the aforementioned embodiment, the same may alternatively be formed by melt recrystallization. The melt recrystallization, which is adapted to melt and recrystallize only surfaces of amorphous silicon films while maintaining a substrate at a temperature of not more than 600° C., includes laser annealing and RTA (rapid thermal annealing). The laser annealing is adapted to heat/melt surfaces of amorphous silicon films by irradiating the same with a laser beam. The RTA is adapted to irradiate surfaces of amorphous silicon films with a lamp beam for heating/melting the same.

While the amorphous silicon films are formed by plasma CVD in the aforementioned embodiment, the same may alternatively be formed by other CVD or PVD (physical vapor deposition). The CVD includes atmospheric pressure CVD, low pressure CVD, plasma CVD, light excitation CVD and the like. The PVD includes vapor deposition, EB (electron beam deposition), MBE (molecular beam epitaxy), sputtering and the like.

Figure 10:
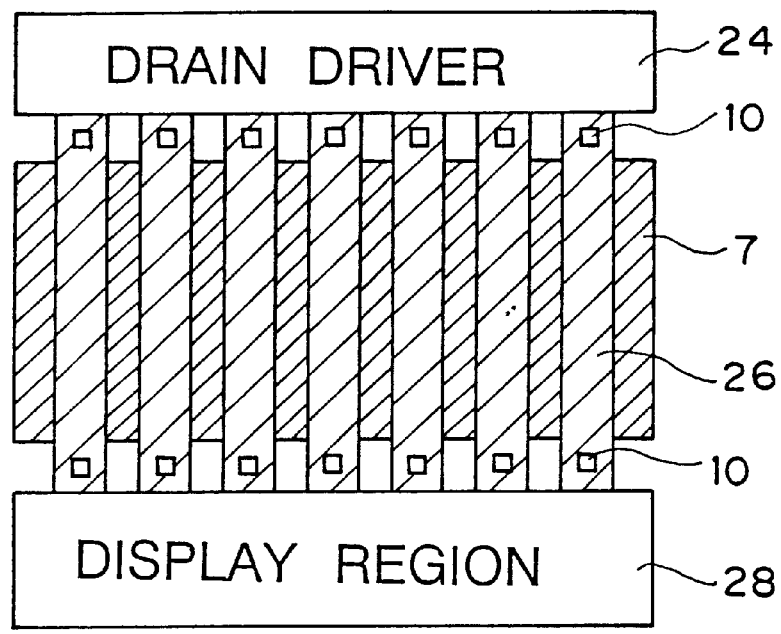
FIG. 10 is a plan view showing a part of a display according to a further embodiment of the present invention.

While additional capacitive electrodes which are plurally divided are shown in the aforementioned embodiments, the present invention is not restricted to this. FIG. 10 is a plan view showing an embodiment in which a single additional capacitive electrode 7 is formed between a drain driver 24 and a display region 8.

FIG. 11 illustrates an equivalent circuit of the display according to the present invention, as already described above.

FIG. 12 is a partial sectional view showing a display according to a further embodiment of the present invention. In this embodiment, a lower wiring 2 which is provided under additional capacitive electrodes 7 and a source region 13 of a TFT of a drain driver are separated from each other. When the source region 13 and the lower wiring 2 are thus separated from each other, it is possible to readily discriminate which portion causes a defect upon occurrence of a failure.

FIG. 13 is adapted to illustrate elimination of a smear phenomenon of a liquid crystal display by forming additional capacitances in a region between a display region and a drain driver according to the present invention. Even if a video signal Vd is abruptly changed between (i+1)-th and (i+2)-th rows, light transmittance (T) immediately responds thereto so that black image is converted to white image without exhibiting a gray part, as shown in FIG. 13. The potential Va of each additional capacitive electrode is set to be smaller than an opposite common electrode potential Vc, as shown in FIG. 13.

Figure 14:
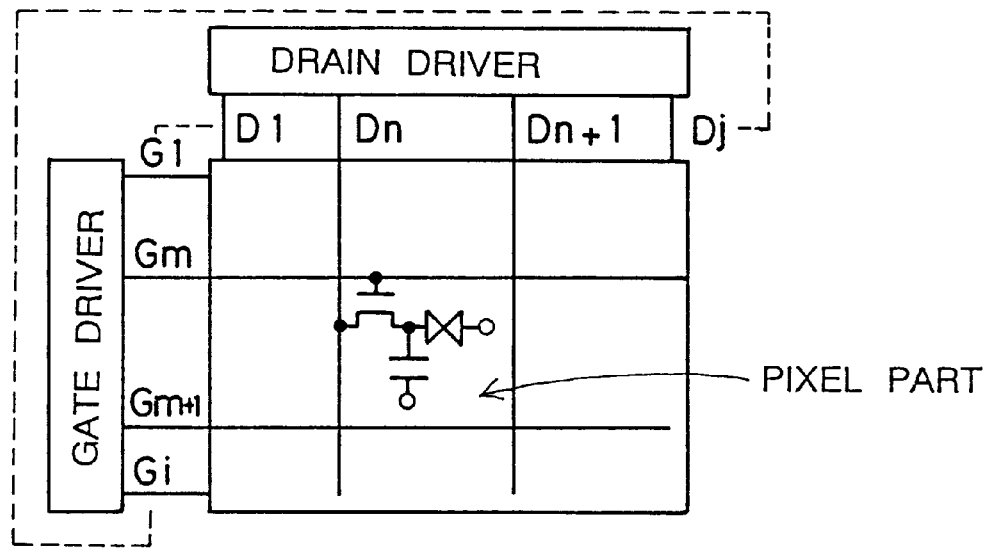
FIG. 14 is a block diagram showing the block structure of an active matrix LCD according to the present invention.
Figure 15:
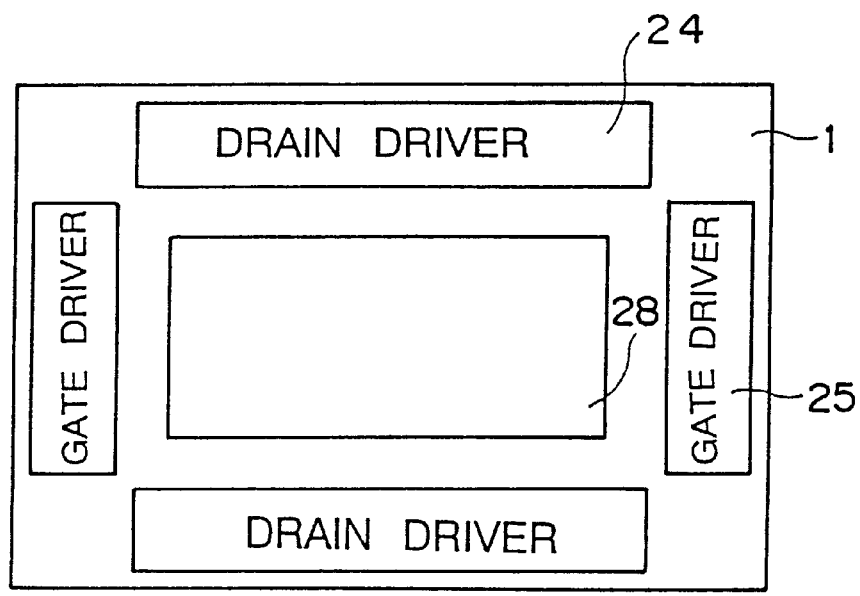
FIG. 15 is a schematic block diagram showing the overall structure of a conventional display.
Figure 16:
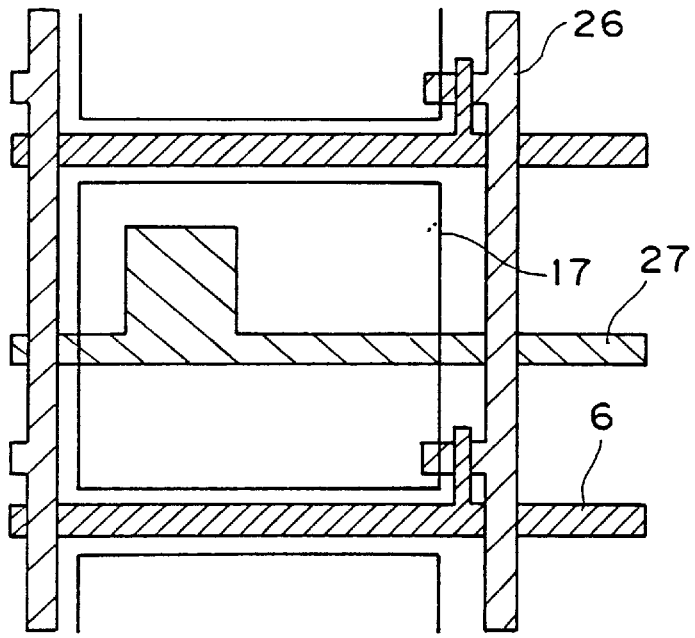
FIG. 16 is a plan view showing a pixel part of the conventional display.
Figure 17:
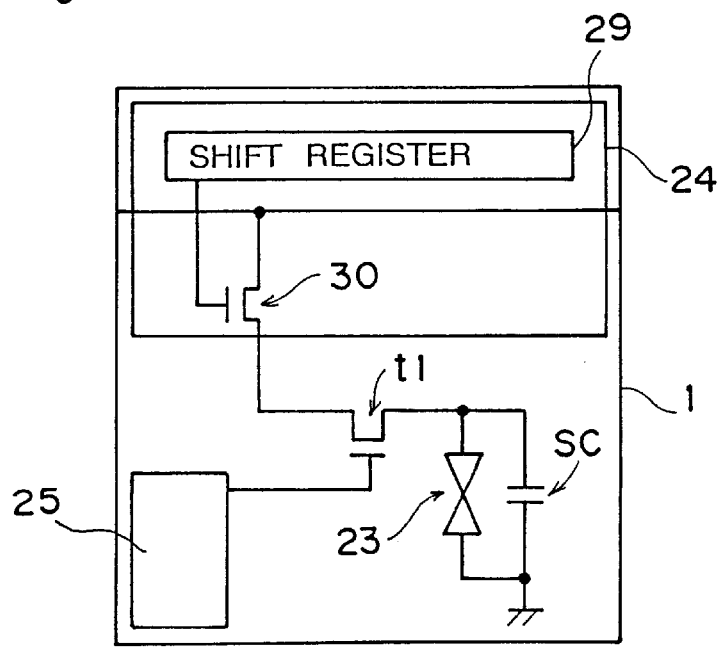
FIG. 17 illustrates an equivalent circuit of the conventional display.
Figure 18:
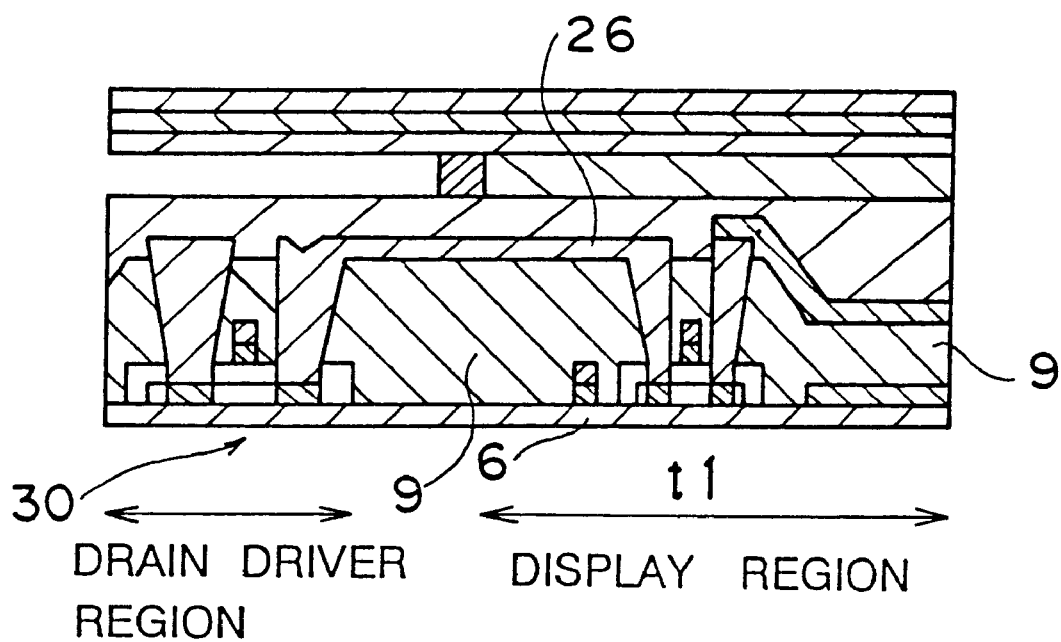
FIG. 18 is a partial sectional view showing the conventional display.
Figure 19:
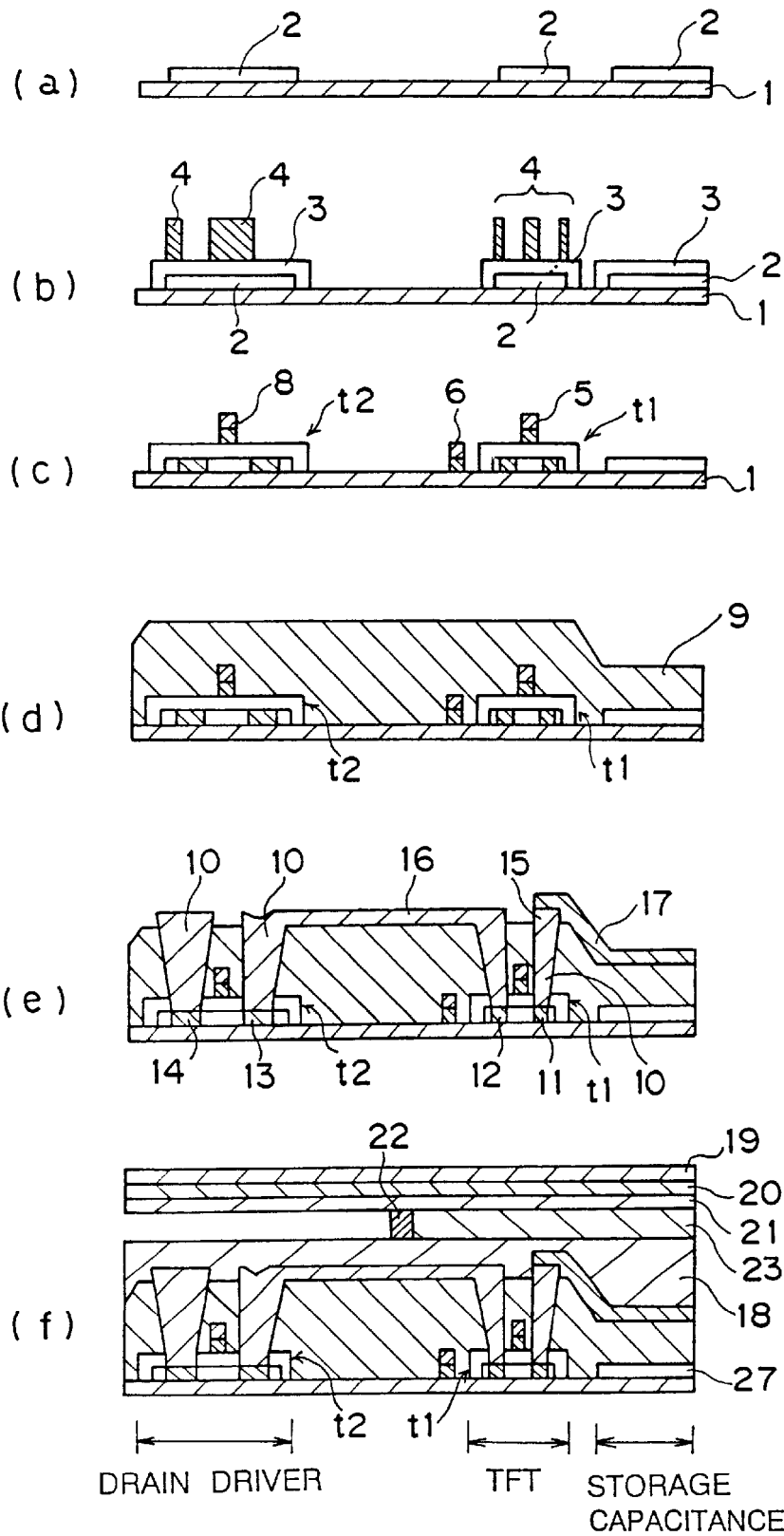
FIGS. 19(a) to 19(f) are partial sectional views showing steps of fabricating the conventional display.

FIG. 14 illustrates the block structure of a liquid crystal display (LCD) of an active matrix system according to the present invention. As shown in FIG. 14, gate lines $G_1 \ldots G_m$, $G_{m+1} \ldots G_i$ and drain lines $D_1 \ldots D_n$, $D_{n+1} \ldots D_j$ are arranged on a pixel part. The gate lines and the drain lines intersect with each other, and pixel parts are provided on the intersections. The gate lines are connected to gate drivers, so that a gate signal is applied thereto. On the other hand, the drain lines are connected to drain drivers, so that a data signal is applied thereto. A peripheral driving circuit part is formed by these drivers. A driver-integrated liquid crystal display according to the present invention is a liquid crystal display in which at least any one of theses drivers is formed on the same substrate as the pixel parts.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display comprising:
   a display region being provided with a display pixel driving element;
   a drain driver being arranged at least on a part around said display region for supplying a video signal to said display pixel driving element of said display region;
   a gate driver being arranged at least on a part around said display region for supplying a scanning signal to said display pixel driving element of said display region;
   a drain line being provided to connect said display region with said drain driver for supplying said video signal; and
   an additional capacitive electrode being provided in a plurally divided manner to said drain line on a region between said display region and said drain driver.

2. The display in accordance with claim 1, further comprising an interlayer insulating film being provided between said drain line and said additional capacitive electrode, a capacitance being formed between said drain line and said additional capacitive electrode.

3. The display in accordance with claim 2, wherein a contact hole is formed in said interlayer insulating film, a capacitance being formed between said drain line in said contact hole and said additional capacitive electrode.

4. The display in accordance with claim 1, further comprising an insulating film being provided under said additional capacitive electrode and a lower wiring being provided under said insulating film, a capacitance being formed between said lower wiring and said additional capacitive electrode.

5. The display in accordance with claim 4, wherein said lower wiring is electrically connected with said drain line at both sides of said additional capacitive electrode.

6. The display in accordance with claim 1, wherein said additional capacitive electrode has a multilayer structure being obtained by forming a metal silicide layer on a polycrystalline silicon layer being doped with an impurity.

7. The display in accordance with claim 1, wherein said display pixel driving element and said drain driver comprise thin film transistors respectively.

8. The display in accordance with claim 7, wherein gate electrodes of said thin film transistors and said additional capacitive electrode are formed by thin films having the same stacked structure.

9. The display in accordance with claim 1, wherein said display pixel driving element, said drain driver and said gate driver are provided on the same substrate.

10. The display in accordance with claim 9, wherein said additional capacitive electrode is provided on said substrate.

11. The display in accordance with claim 9, wherein said additional capacitive electrode is provided on an insulating film that is on a lower wiring and the lower wiring is provided on said substrate.

12. The display in accordance with claim 1, wherein said drain driver comprises a sampling transistor for sampling said video signal being supplied to said display pixel driving element.

13. A liquid crystal display comprising:
    a display pixel driving element for driving a liquid crystal display pixel;
    a drain driver having a sampling transistor for sampling a video signal being supplied to said display pixel driving element;
    a gate driver supplying a scanning signal to said display pixel driving element;
    a drain line being provided to connect said display pixel driving element with said drain driver for supplying said video signal; and
    an additional capacitance electrode being provided between said sampling transistor and said display pixel driving element;
    wherein said additional capacitance electrode is provided in a plurally divided manner to said drain driver.

14. A display comprising:
    a display region being provided with a display pixel driving element;
    a drain driver being arranged at least on a part around said display region for supplying a video signal to said display pixel driving element of said display region;
    a gate driver being arranged at least on a part around said display region for supplying a scanning signal to said display pixel driving element of said display region;
    a drain line being provided to connect said display region with said drain driver for supplying said video signal;
    an additional capacitive electrode being provided on a region between said display region and said drain driver; and
    an interlayer insulating film being provided between said drain line and said additional capacitive electrode, a capacitance being formed between said drain line and said additional capacitive electrode;
    wherein a contact hole is formed in said interlayer insulating film, a capacitance being formed between said drain line in said contact hole and said additional capacitive electrode.

15. A display comprising:
    a display region being provided with a display pixel driving element;
    a drain driver being arranged at least on a part around said display region for supplying a video signal to said display pixel driving element of said display region;
    a gate driver being arranged at least on a part around said display region for supplying a scanning signal to said display pixel driving element of said display region;
    a drain line being provided to connect said display region with said drain driver for supplying said video signal;

an additional capacitive electrode being provided on a region between said display region and said drain driver;

an interlayer insulating film being provided between said drain line and said additional capacitive electrode, a capacitance being formed between said drain line and said additional capacitive electrode; and an insulating film being provided under said additional capacitive electrode and a lower wiring being provided under said insulating film, a capacitance being formed between said lower wiring and said additional capacitive electrode;

wherein said drain line is positioned over said additional capacitive electrode and said lower wiring is positioned under said additional capacitive electrode.

* * * * *